United States Patent [19]

Sundlof

[11] 4,128,268
[45] Dec. 5, 1978

[54] FLOWER CAR CONVERTING UNIT

[76] Inventor: Kenneth C. Sundlof, 2320 Wyckwood, Aurora, Ill. 60506

[21] Appl. No.: 746,401

[22] Filed: Dec. 1, 1976

[51] Int. Cl.$^2$ ............................................... B60P 3/02
[52] U.S. Cl. ........................................ 296/10; 296/21
[58] Field of Search ............... 296/1 R, 10, 16, 37.1, 296/17, 21, 76

[56] References Cited
U.S. PATENT DOCUMENTS

| | | | |
|---|---|---|---|
| 2,777,727 | 1/1957 | Reilly | 296/21 |
| 2,909,388 | 10/1959 | Reilly | 296/21 |

*Primary Examiner*—Philip Goodman
*Attorney, Agent, or Firm*—Allegretti, Newitt, Witcoff & McAndrews

[57] ABSTRACT

The disclosure describes an improved apparatus for converting a passenger automobile into a vehicle suitable for carrying flowers in a funeral procession. A reservoir is positioned inside the trunk of the vehicle for holding flowers and for catching water draining from the flowers. A fiberglass display cover partially encloses the trunk and defines an opening through which the flowers protrude. Drains carry the water from the reservoir through the display cover to the rear of the vehicle. The display cover is attached to the hinges which normally hold the trunk lid, so that the vehicle easily can be converted to a conventional automobile.

6 Claims, 6 Drawing Figures

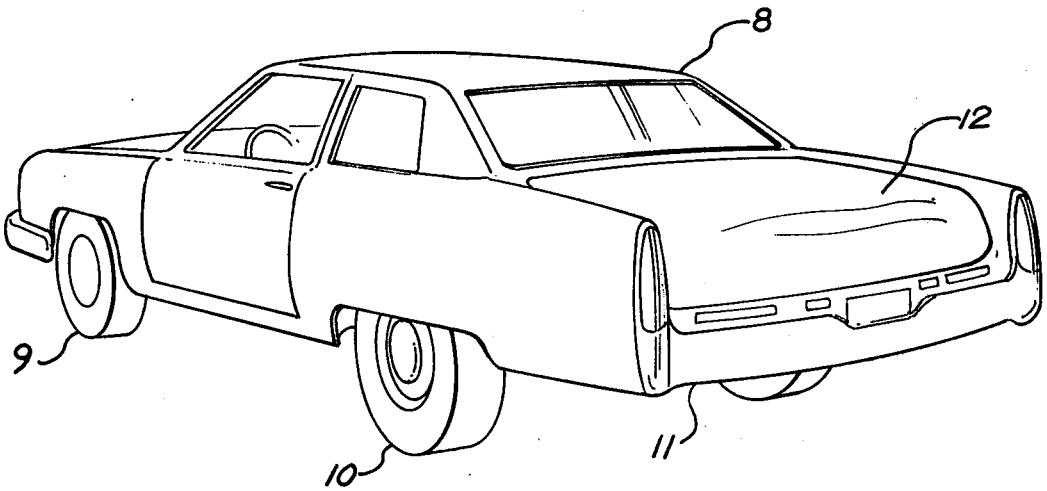
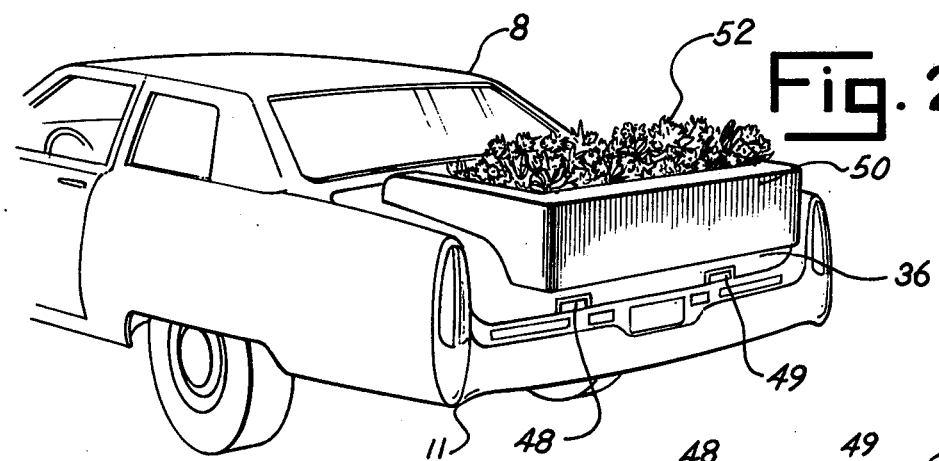
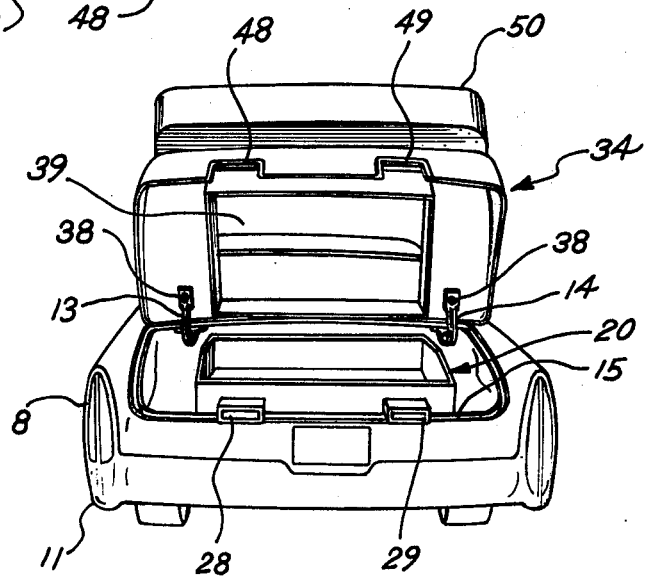

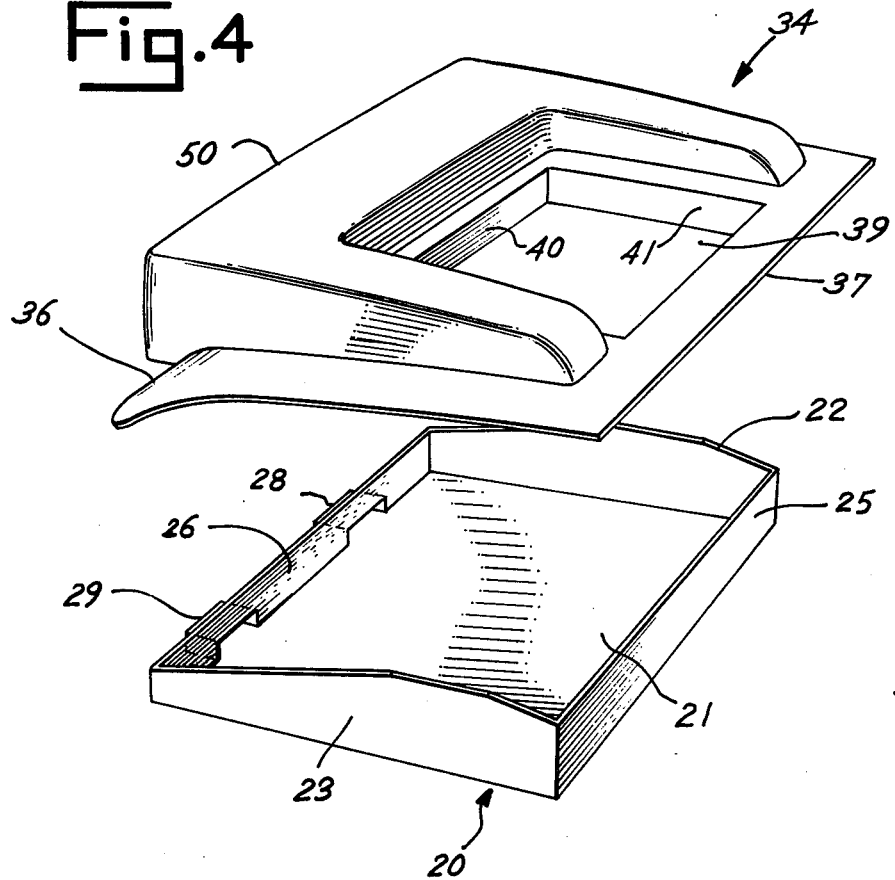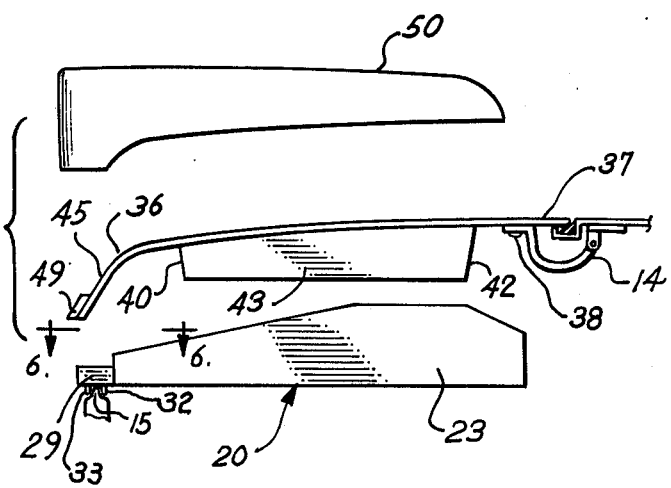

FLOWER CAR CONVERTING UNIT

BACKGROUND AND SUMMARY OF THE INVENTION

This invention relates to flower-carrying vehicles, and more particularly relates to means for converting a conventional sedan into a flower-carrying vehicle suitable for use in a funeral procession.

In the past, units have been devised for converting a convertible or pick-up truck into a flower-carrying vehicle. However, each of these units has exhibited deficiencies which have limited its overall usefulness. For example, U.S. Pat. Nos. 2,657,087; 2,777,727 and 2,909,388 each described means for adapting a convertible automobile to carry flowers. Although these units result in an adequate vehicle, they are expensive to implement. Each requires a custom convertible top which fits over the front seat of the vehicle. In addition, the conversion units are cumbersome and difficult to assemble. Once the conversion unit has been installed, considerable labor is required in order to restore the vehicle to its initial condition. Since convertibles no longer are assembled in the United States on a regular production basis, such convertible conversion units will be difficult to employ in the near future.

U.S. Pat. No. 2,964,349 describes the conversion of a pick-up truck to an undertaker's vehicle. Once the truck has been converted, major body work is needed to restore it to its original condition.

Accordingly, it is a primary object of the present invention to provide apparatus for conveniently, quickly and inexpensively converting a conventional automobile having a trunk lid, such as a sedan, to a flower-carrying vehicle and vice-versa.

Another object of the invention is to provide apparatus of the foregoing type in which the trunk of the sedan is used to carry the flowers.

Still another object of the invention is to provide apparatus of the foregoing type in which a flower display unit is substituted for the trunk lid of the sedan.

Yet another object of the invention is to pivot the flower display unit on the same hinges normally used to support the trunk lid of the sedan, so that the vehicle may be conveniently and inexpensively converted from a conventional sedan to a flower-carrying funeral car.

Another object of the invention is to provide apparatus of the foregoing type in which a reservoir located in the trunk catches any water which drains from the flowers.

Still another object of the invention is to provide a means of securing the apparatus within a trunk without using screws or clamps.

DESCRIPTION OF THE DRAWINGS

These and other objects and advantages of the invention will hereafter appear in connection with the accompanying drawings, wherein like numbers refer to like parts throughout, and wherein:

FIG. 1 is a perspective view of a conventional sedan having a trunk lid suspended on hinges;

FIG. 2 is a fragmentary, perspective view of the automobile shown in FIG. 1 converted in accordance with the invention to a vehicle suitable for carrying flowers in a funeral procession;

FIG. 3 is a rear-view of the vehicle shown in FIG. 2 with the flower display cover raised on the hinges normally used to support the trunk lid;

FIG. 4 is an exploded, perspective view showing a preferred form of the apparatus made in accordance with the present invention;

FIG. 5 is an exploded, side-elevational view of the apparatus shown in FIG. 4, illustrating the manner in which the display cover is mounted on the trunk lid hinges; and FIG. 6 is a fragmentary, top plan view taken along line 6—6 in FIG. 5.

DESCRIPTION OF THE PREFERRED EMBODIMENT

Referring to FIG. 1, a conventional automobile 8 is shown having a front wheel 9, a rear wheel 10 and a rear bumper 11. The automobile, which is a two-door, six-passenger sedan, also includes a trunk lid 12 which is normally suspended on hinges 13, 14 (FIG. 3). The trunk lid engages a latch (not shown) on a trunk lip 15.

In order to convert the sedan shown in FIG. 1 to a flower-carrying vehicle suitable for use in a funeral procession, the user would install a unit comprising a reservoir 20 and a display assembly 34. Referring to FIGS. 3–5, reservoir 20 is an aluminum box including a bottom 21, side walls 22, 23, a front wall 25 and a rear wall 26. Drain channels 28 and 29 protrude from the rear wall adjacent the bottom. A pair of parallel mounting studs 30, 31 are located on the bottom of channel 28 (FIG. 6) and a like pair of studs 32, 33 are located on the bottom of channel 29. The studs are mounted over trunk lip 15 as shown. Due to the curvature of lip 15, the studs hold the reservoir in place against lateral as well as forward to rear motion. This is an important feature which enables the reservoir to be secured without screws or clamps. Flower pots or other display materials are put in the reservoir, and the drain water from the flowers flows to the rear of the reservoir and out the drain channels to the rear of the vehicle.

Display assembly 34 comprises a fiberglass trunk cover 36 which is attached to lid hinges 13 and 14 at a front edge 37 by screws 38. Cover 36 defines an opening 39 which is adjacent depending lips 40–43. Cover 36 is integrally formed with a rear lip 45 that is fitted with shields 48, 49. The shields cover channels 28, 29 when the cover 36 is lowered to the closed position shown in FIG. 2. A simulated, folded top 50 is built on any convenient frame and is covered with black vinyl. The top may be as elaborate or well-simulated as desired.

In order to convert the vehicle shown in FIG. 1 to a flower-carrying car, the conventional trunk lid 12 is removed from hinges 13, 14 and is replaced by the fiberglass-molded trunk cover 36. After trunk cover 36 is raised, reservoir 20 is positioned in the trunk cavity with the studs straddling lip 15. Opening 39 is positioned over the reservoir so that pots or bouquets of flowers 52 can be lowered through opening 39 and rested against the bottom of the reservoir. Of course, channels 28, 29 must be aligned with shields 48, 49 so that the channels will be covered when the trunk cover is lowered. Channels 28 and 29 extend over and to the rear of trunk lip 15 so that drain water flows outside the trunk and to the rear of the sedan. Trunk cover 36 is fitted with the same type of latching mechanism as trunk lid 12 in order to securely hold the cover in place while the car is in motion.

Those skilled in the art will recognize that the single embodiment of the invention described herein may be altered and modified without departing from the true spirit and scope of the invention as defined in the accompanying claims.

What is claimed is

1. Apparatus for converting a passenger automobile including a trunk having a lid suspended on hinges into a vehicle suitable for carrying flowers in a funeral procession comprising:

reservoir means positioned inside the trunk for holding flowers and for catching water draining from the flowers, said reservoir means comprising drain means for draining water to the rear of the automobile;

flower display means defining drain openings through which the drain means extend for partially covering the trunk and for defining a flower opening located over the reservoir means through which the flowers may protrude; and fastener means for attaching the display means to the hinges in place of the lid, whereby the vehicle can be used as a conventional automobile by replacing the display means with the lid.

2. Apparatus, as claimed in claim 1, wherein the flower display means is fabricated from fiberglass.

3. Apparatus, as claimed in claim 1, wherein the trunk comprises a lip and wherein the reservoir means comprises stud means for straddling the lip so that the reservoir means is held in place in the trunk.

4. Apparatus, as claimed in claim 1, wherein the flower display means comprises shield means for covering the drain means.

5. Apparatus, as claimed in claim 4, wherein the flower display means comprises means for simulating a folded top.

6. Apparatus, as claimed in claim 5, wherein the means for simulating is located around the flower opening.

* * * * *